United States Patent
Ohyama

(12) 
(10) Patent No.: US 6,952,000 B2
(45) Date of Patent: Oct. 4, 2005

(54) RICE COOKING SYSTEM FOR MICROWAVE OVEN

(75) Inventor: Yoshio Ohyama, Chigasaki (JP)

(73) Assignees: Takashi Nishihira, Tokyo (JP); Hiroshi Ono, Tokyo (JP); Taku Hata, Tokyo (JP); Nobumasa Yokoo, Tokyo (JP)

( * ) Notice: Subject to any disclaimer, the term of this patent is extended or adjusted under 35 U.S.C. 154(b) by 0 days.

(21) Appl. No.: 10/901,522

(22) Filed: Jul. 28, 2004

(65) Prior Publication Data

US 2005/0184064 A1 Aug. 25, 2005

(30) Foreign Application Priority Data

Feb. 6, 2004 (JP) ........................................ 2004/030566
Mar. 31, 2004 (JP) ........................................ 2004/101953

(51) Int. Cl.[7] ............................. H05B 6/80; A47J 27/00
(52) U.S. Cl. ........................ 219/734; 219/732; 219/735; 219/762; 219/736; 99/DIG. 14; 99/418; 99/403; 126/369; 126/383.1
(58) Field of Search ................................ 219/725–735, 219/736, 762; 99/DIG. 14, 403–418; 426/241, 243; 126/369–390.1

(56) References Cited

U.S. PATENT DOCUMENTS

| 5,277,326 A | * | 1/1994 | Chiba | 99/403 |
| 5,387,781 A | * | 2/1995 | Berkoff | 219/735 |
| 5,558,798 A | * | 9/1996 | Tsai | 219/731 |

FOREIGN PATENT DOCUMENTS

| JP | 2002-52069 | | 2/1996 |
| JP | 10-165298 | * | 6/1998 |
| JP | 2000-201809 | * | 7/2000 |

* cited by examiner

Primary Examiner—Philip H. Leung
(74) Attorney, Agent, or Firm—Howson and Howson

(57) ABSTRACT

A rice cooking system for a microwave oven comprises an inner cooking container for containing rice and rice cooking water, main outer container holding the inner container with a space in between their side surfaces, a lid covering the outer container, and a foam control sheet having a plurality of small holes 52 and supported between the outer container and the lid. The inner cooking container is made of metal and has a folded or rolled a rim. A step at the bottom of the outer container locates the inner cooking container so that its outer wall is spaced from the outer container.

8 Claims, 9 Drawing Sheets

RICE COOKING SYSTEM FOR MICROWAVE OVEN

FIELD OF THE INVENTION

This invention relates to a system for cooking rice in a microwave oven. It relates more particularly to a cooking system capable of separating and removing rice bran (fat), which gives rice a peculiar odor or turns its color to a yellowish white, and which is capable of heating a quantity of rice evenly as a whole, by preventing sudden local heating, and which is capable of improving the flavor of cooked rice.

BACKGROUND OF THE INVENTION

A microwave oven has been used conventionally as a convenient tool with which food and drink can be heated easily. A container made of heat-resistant plastic sheet and having a hermetically sealed lid, is widely used as a container in which food (including fresh food and processed food) is heated and cooked in a microwave oven.

Among such containers with a hermetically sealed lid, there is a rice cooker for a microwave oven as shown in FIG. 13, the purpose of which is to cook rice. Such a container is described in unexamined Japanese Patent Publication No. 052069/1996. The rice cooker 1 comprises an inner container 2 containing rice and rice cooking water, an outer container 3 holding the inner container 2 with space between them, an outer lid 4 covering both the outer container 3 and the inner container 2, and a microwave blocking layer 5, provided for convection of rice cooking water in the inner container 2. A water-conducting opening 8 is formed on the inner container 2 so that the inner container 2 may be connected to the outer container 3, and some rice cooking water may flow into space A formed between the inner container 2 and the outer container 3 as heat-retaining water.

Since this rice cooker is heated only from the bottom of the inner container 2 due to the microwave blocking layer 5, it is said to achieve effective convection within its contents, and to prevent boiling over or dehydration due to local heating.

Despite the microwave blocking layer 5 formed on the upper part of the rice cooker, microwave energy received from the side can cause excessive local heating, resulting in uneven heating.

During cooking of rice, ingredients contained in the rice dissolve, forming a paste foam that rises inside the rice cooker. The components of the foam are remixed with the rice by convection. The paste foam contains two kinds of ingredients: gelatinized starch (carbohydrate), which gives rice glutinousness and flavor, and rice bran (fat), which gives rice an unpleasant odor and turns its color from white to yellowish white.

This rice bran has been a problem, since it may not be separated at the time of rice cooking, not only when it is cooked in a conventional rice cooker for a microwave oven, but also when it is cooked in a common electric rice cooker, a gas rice cooker, or a pot heated by gas, charcoal, or firewood etc.

In view of the above problems, the invention aims to provide a rice cooking system for a microwave oven, which is capable of separating and removing rice bran which gives rice a peculiar odor and turns the color of rice to yellowish white; which is capable of heating rice evenly as a whole by preventing sudden local heating; and which generally produces a cooked rice having a superior appearance and flavor.

SUMMARY OF THE INVENTION

The cooking system according to the invention, comprises an inner cooking container, having a side surface, for containing a food and cooking water, an outer container, also having a side surface, holding the inner container, with a space between the side surfaces of the containers, a lid covering the outer container, and a sheet having a plurality of holes supported between the outer container and the lid. The inner container is made of metal, and has a folded or rolled rim at the top of its outer surface. A step is provided at the bottom of the outer container for locating the inner container in fixed relationship to the outer container. Preferably, a cap is fitted on an upper part of the lid, allowing steam to be released between the lid and the cap. The area of the holes of the foam control sheet is preferably not more than 2.5% of the total area of the sheet, except that the sheet may be provided with a central hole having cuts extending from the edge of the central hole, in which case the total area of the holes in the sheet, including the hole in the center of the sheet, is not greater than 8.5% of the total area of the sheet.

The sheet having holes returns to the rice only gelatinized carbohydrate starch, while separating out and removing rice bran, which is carried into the space between the inner and outer containers.

DETAILED DESCRIPTION OF THE PREFERRED EMBODIMENTS

Figure 1:
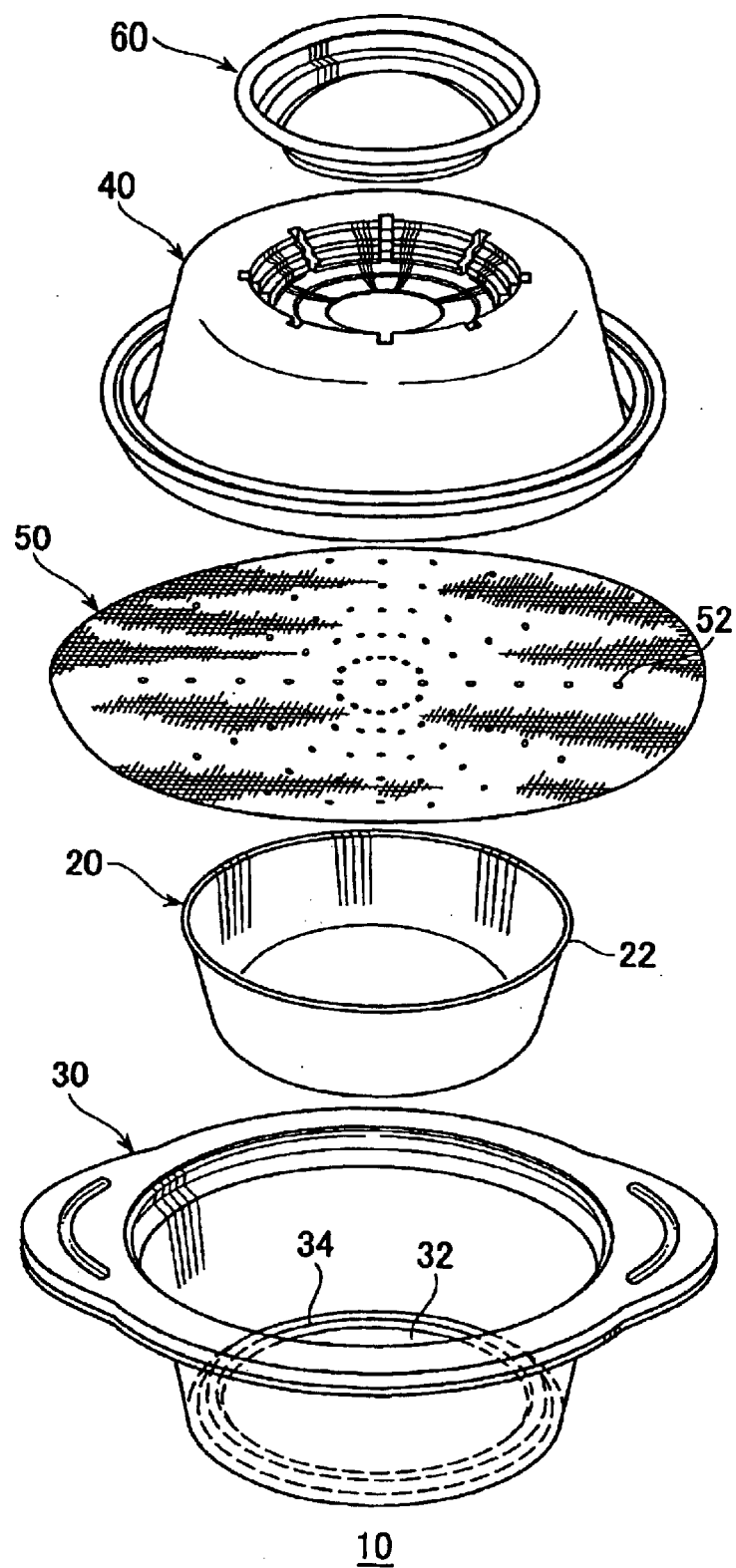
FIG. 1. is an exploded perspective view of a rice cooking system for a microwave oven in accordance with a first embodiment of the invention.
Figure 2:
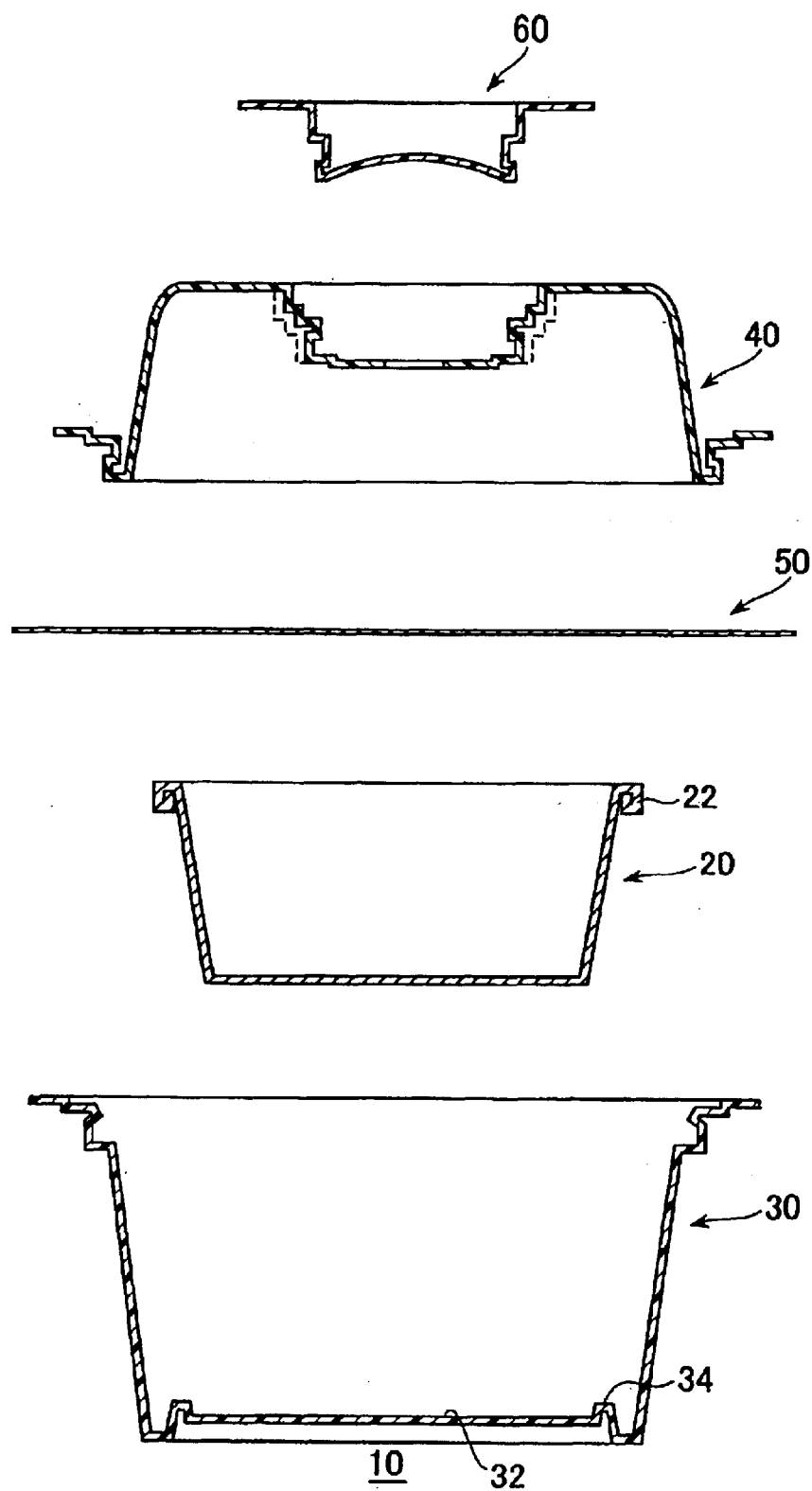
FIG. 2 is an exploded cross-sectional view of the main components of the rice cooking system of FIG. 1.

A rice cooking system in accordance with the first embodiment of the invention will be explained with reference to FIGS. 1 and 2, in which an inner container 20 is positioned inside an outer container 30 closed by a lid 40. A foam control sheet 50, having a plurality of small holes 52, fits between, and is supported by, the outer container and the lid. The foam control sheet is space from, but overlies, the upper edge of the inner container. A cap 60 fits into a recess in the lid 40, and during cooking, steam is released between the lid and the cap.

The inner container 20 holds rice and cooking water. The inner container is disposed within the outer container, the side walls of the respective inner and outer containers being spaced from each other. A step section 34, provided on a bottom 32 of the outer container 30, maintains the inner container 20 in coaxial relationship with the outer container.

The inner container 20 is made of metal, preferably aluminum or stainless steel, and its rim 22 is folded or rolled. Folding or rolling of the rim of the inner container 20 prevents the generation of sparks which occurs when a container of metal materials are used in a microwave oven. The manner in which the generation of sparks is prevented is explained in unexamined Japanese Patent Publication No. 57285/2000. Spark prevention enables a container made of metal to be used safely in a microwave oven.

Figure 3A:
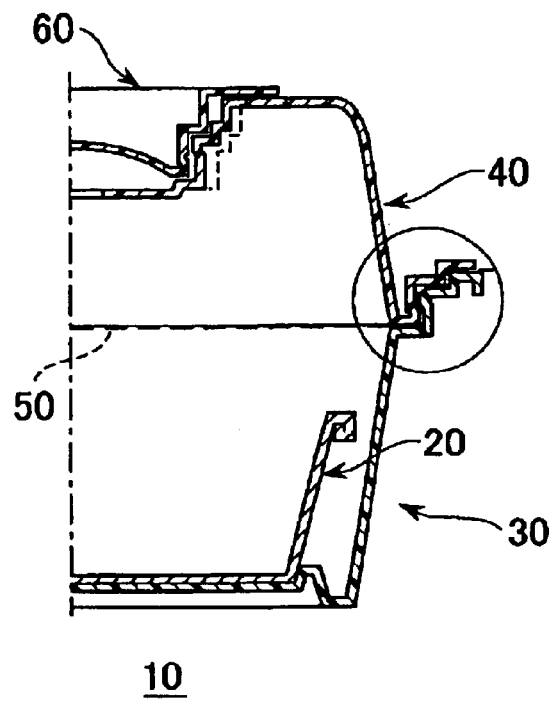
FIG. 3(a) is a cross-sectional view showing the manner in which the components of the rice cooking system of FIGS. 1 and 2 fit together.
Figure 3B:
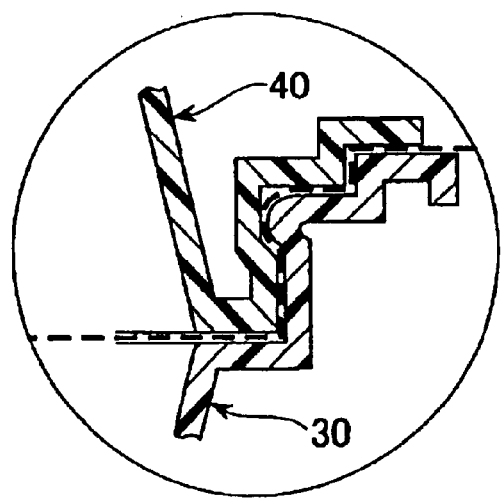
FIG. 3(b) is an enlarged cross-sectional view showing details of the relationship between the lid and the outer container.

The foam control sheet 50 is made of a non-woven fabric. The small holes 52 preferably have a diameter of about 2 mm, and a total area of about 2.5% or less of the area of the foam control sheet 50. It is desirable that the foam control sheet 50 be as thin as possible so that the outer container 30 and the lid 40 may be fitted to each other as shown in FIG. 3. However, when the strength and flexibility of the sheet are considered, a suitable sheet thickness is around 50 micron.

A "non-woven fabric" is a sheet fabric comprising a mixture of synthetic fibers and synthetic resins. A non-woven is preferably used for the foam control sheet of the invention. because the non-woven fabric does not lose strength, even if it is wet, and has excellent flexibility, During the cooking of rice, ingredients contained in rice dissolve, forming a paste, which foams and rises within the cooking container 20. As the foam rises, it contacts the foam control sheet 50. Among these paste-forming ingredients are gelatinized starch. Gelatinized starch contributes to the flavor of the rice, and has a high specific gravity. When the foam contacts the foam control sheet 50, which is in an arcuate shape due to the pressure underneath it, the foam breaks up and the starch returns to the inner container 20. On the other hand, the foam also contains rice bran foam, which causes unpleasant odors and a change in the color of the rice. The rice bran foam has a lower specific gravity and therefore moves toward the edge of the foam control sheet 50, where it forms into drops. These drops gather and fall into the space formed between the outer surface of the inner container 20 and the inner surface of the outer container 3D. Thus, the foam control sheet 50 separates the rice bran foam component from the gelatinized starch foam component, and prevents the rice bran foam from returning to the inner container 20.

Figure 4:
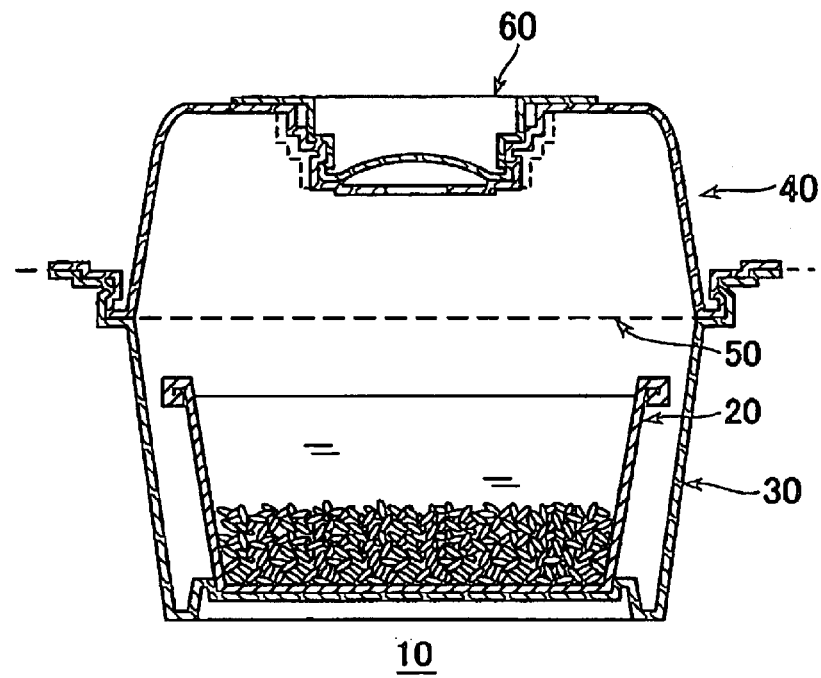
FIG. 4 is a schematic view showing the rice cooking system as cooking begins.

In FIGS. 4–9, arrows in the figures indicate the moving direction of steam, starch, or rice bran, etc. FIG. 4, which shows a rice cooking system 10 when cooking begins, the cooking container 20 typically holds 140 g (one cup) of rice and 270 g of rice cooking water. The rice cooking system 10 according to the invention requires about 1.25 times as much water as is required for ordinary rice cooking. The weight ratio of rice to water is set from about 1 to 1.8 to about 1 to 1.95. It is desirable to soak rice in water for about 20–30 minutes in advance. Therefore, instead of water, various kinds of soup or juice may be used for the cooking water. The rice is preferably washed thoroughly before being put into the inner container 20. Pre-washed rice may be used, and when pre-washed rice is used, the amount of water is preferably increased by 3–10%.

Figure 5:
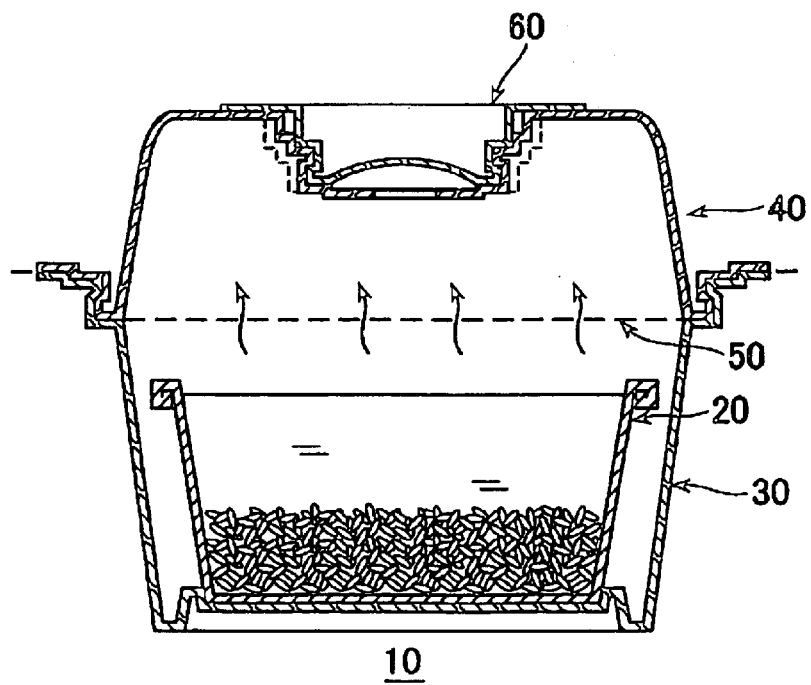
FIG. 5 is a schematic view showing the rice cooking system at about 5 to 6 minutes after cooking begins.

FIG. 5 shows the rice cooking system 10, about 5 to 6 minutes after cooking begins. At this stage in the cooking process, a large amount of steam is released from the inner container 20. The steam passes through the foam control sheet 50, and fills the lid 40.

Figure 6:
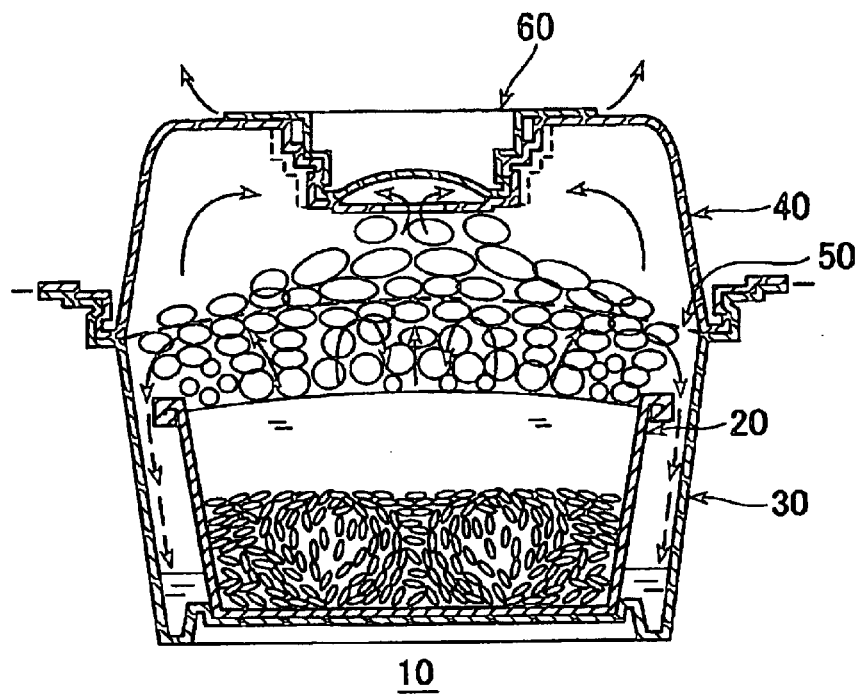
FIG. 6 is a schematic view showing the rice cooking system at about 9 to 10 minutes after cooking begins.

FIG. 6 shows the rice cooking system 10, about 9 to 10 minutes after cooking begins. At this time, the rice at the bottom of the inner container 20 begins to move and circulate. The rice absorbs water and expands, and the starch component of the rice is gelatinized. Boiling of the water turns the gelatinized starch into foam, which expands and rises. The foam contacts the foam control sheet 50, and the pressure underneath the foam control sheet causes the sheet to deform gradually, and assume and arcuate shape. Among the foam components, the relatively heavy carbohydrate starch engages the foam control sheet 50, and the bubbles of the foam explode, allowing the starch to return to the inner container 20.

The rice bran foam, which causes rice to have an unpleasant odor and changes the color of the rice, has a low specific gravity, and therefore moves toward the rim of the foam control sheet 50, where it forms into drops and runs down into the space between the outer wall of the inner container 20 and the inner wall of the outer container 30. The rice bran accumulating in this space does not return to the rice being cooked in container 20. In addition, the liquid containing this rice bran has a temperature that can be 20–30% higher (on the Celsius scale) than the temperature of the liquid within the inner container 20. Thus, the liquid containing the rice bran can impart heat to the wall and the bottom of the container 20 during cooking, and may also steam the cooked rice after cooking.

A portion of the foam having a low degree of adhesiveness passes through the foam control sheet 50 and enters into the space between the foam control sheet and the lid 40. There, it forms a thin, weak foam, which expands and rises toward the upper part of the lid 40. However, when this form contacts the cap 60, which fits in a recess in the upper part of the lid 40, it is broken and drops back onto the foam control sheet 50. Therefore, the foam produced the rice cooking system is prevented from spilling out of the rice cooking system 10.

Figure 7:
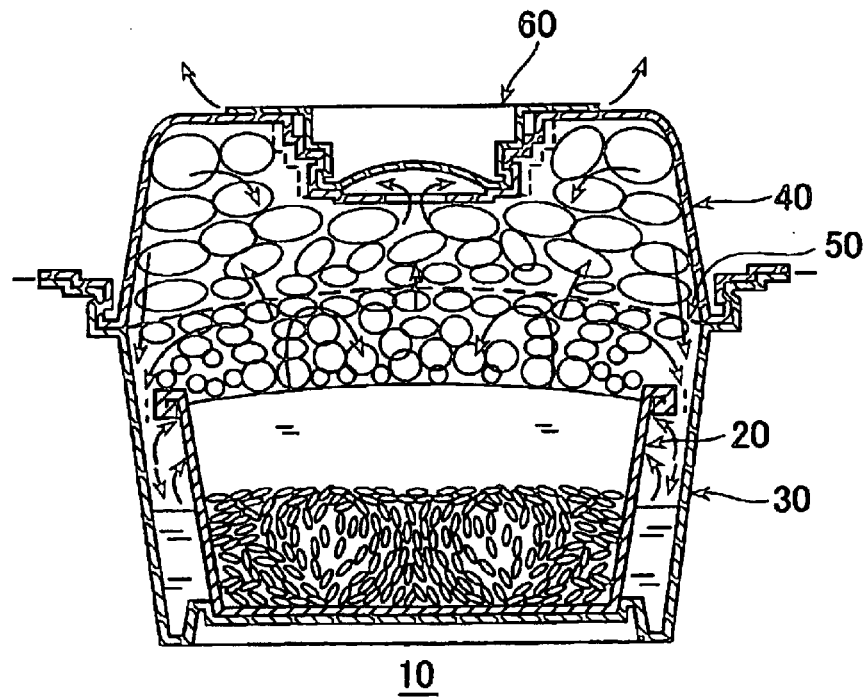
FIGS. 7, 8 are schematic views showing the rice cooking system at about 13 to 14 and 17 to 18 minutes after cooking begins, respectively.

As shown in FIG. 7, at about 13–14 minutes after cooking begins, the cooking of the rice proceeds further in container 20, and the rice is about 60% cooked. The volume ratio of rice expands, and the ratio of rice to hot water reaches about 80:20.

Figure 8:
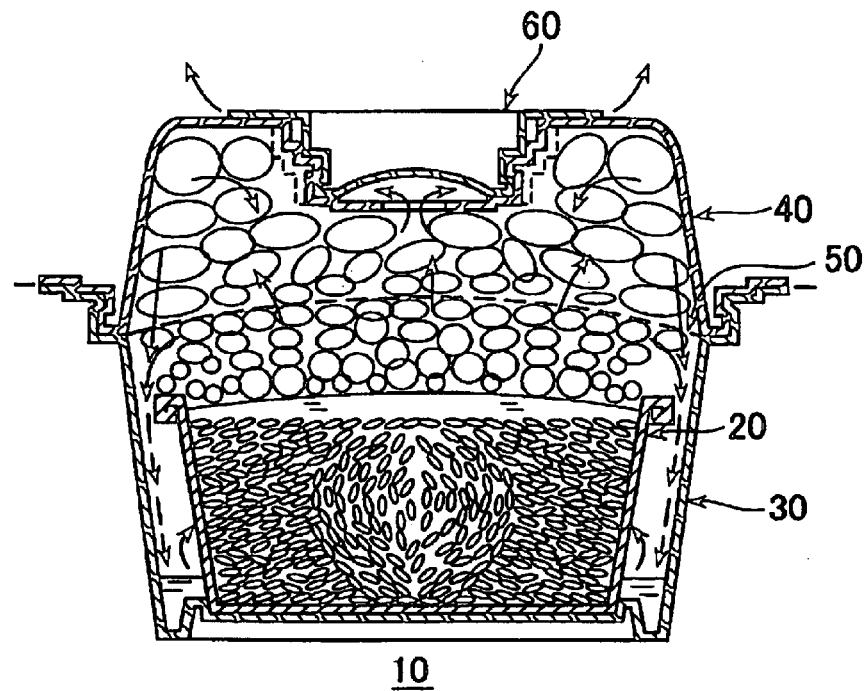

As shown in FIG. 8, at about 16–17 minutes after cooking begins, the rice is about 90% cooked. At this time, the volume ratio of rice expands further, so that the ratio of rice to hot water reaches about 95:5.

Figure 9:
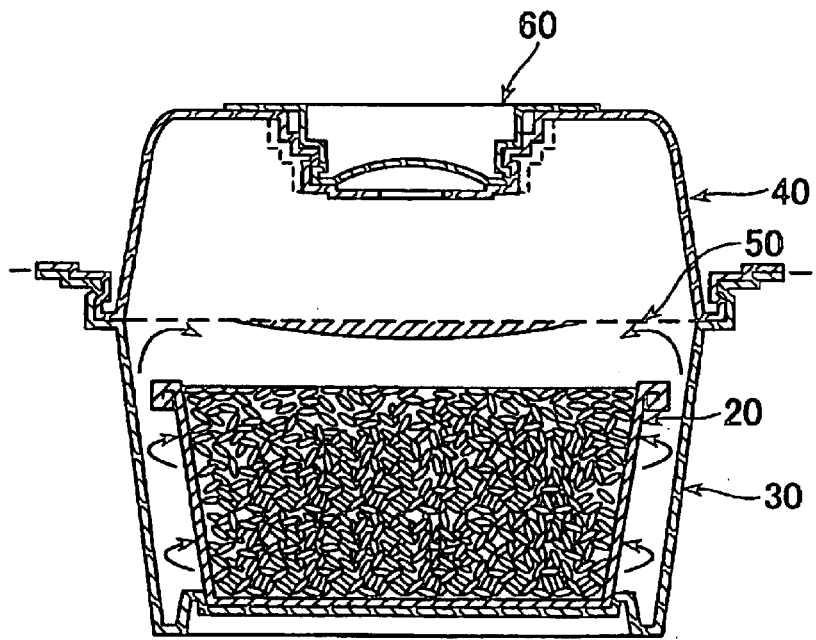
FIG. 9 is a schematic view showing the rice cooking system at about 18 minutes after cooking begins.

As shown in FIG. 9, at about 18 minutes after cooking begins, cooking is completed. At this time, a quantity of paste adheres to the foam control sheet 50.

After completion of cooking, the lid 40 and the foam control sheet 50 are removed, and the rice is stirred. Then, lid 40 is placed back on the outer container 30, without the foam control sheet, and the rice is steamed for 3–5 minutes.

It has been found that the rice cooked using the system and method described above does not have an unpleasant odor. Each grain has a silver-like shine and a plump and tender core. The resulting rice has been found to have a delicious flavor.

Since the rice cooking system according to the invention effectively separates and removes rice bran, which causes an unpleasant odor and change of color, the system is particularly suitable for cooking old rice.

Although the invention has been described in the context of cooking rice, the system may also be used to cook, for example, pasta, beans, dried foods, and cooked food, etc.

Figure 10:
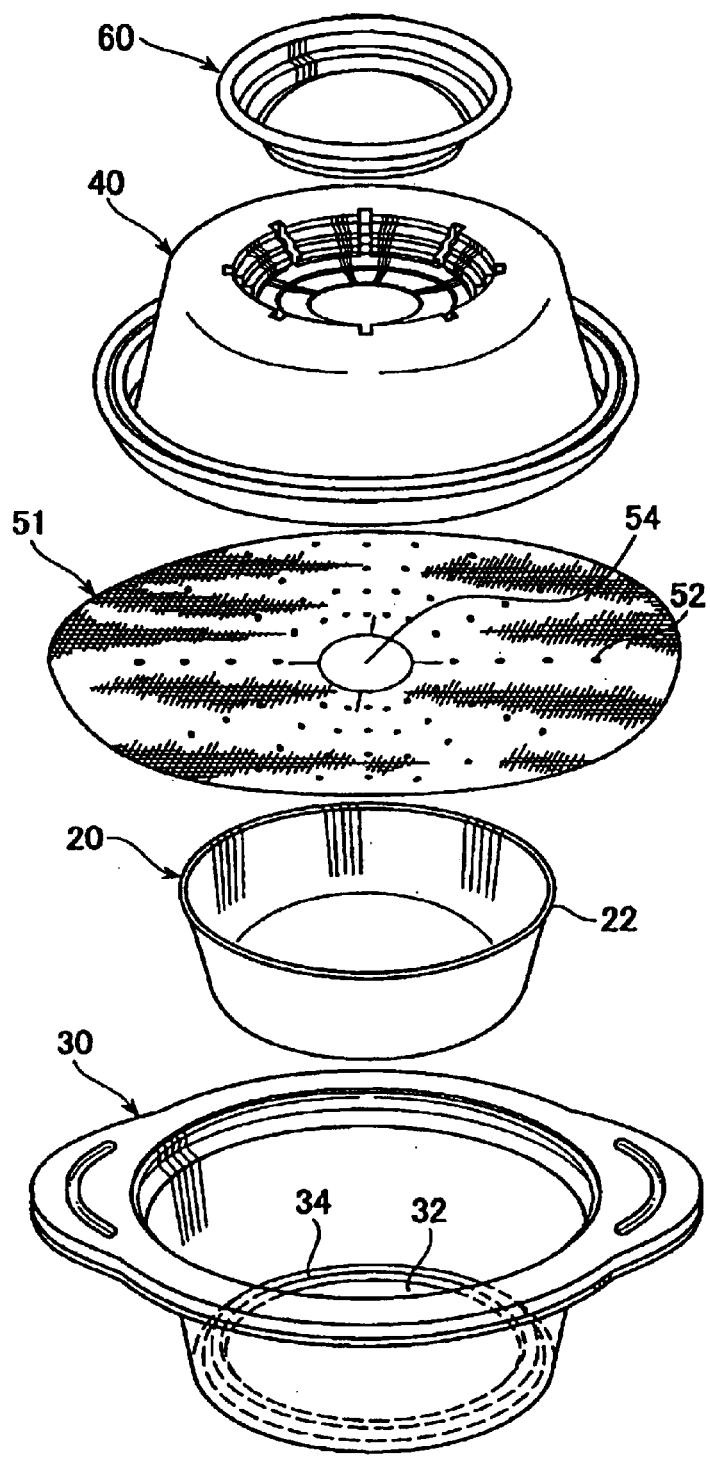
FIG. 10 is an exploded perspective view of a rice cooking system for a microwave oven in accordance with a second embodiment of the invention.
Figure 11:
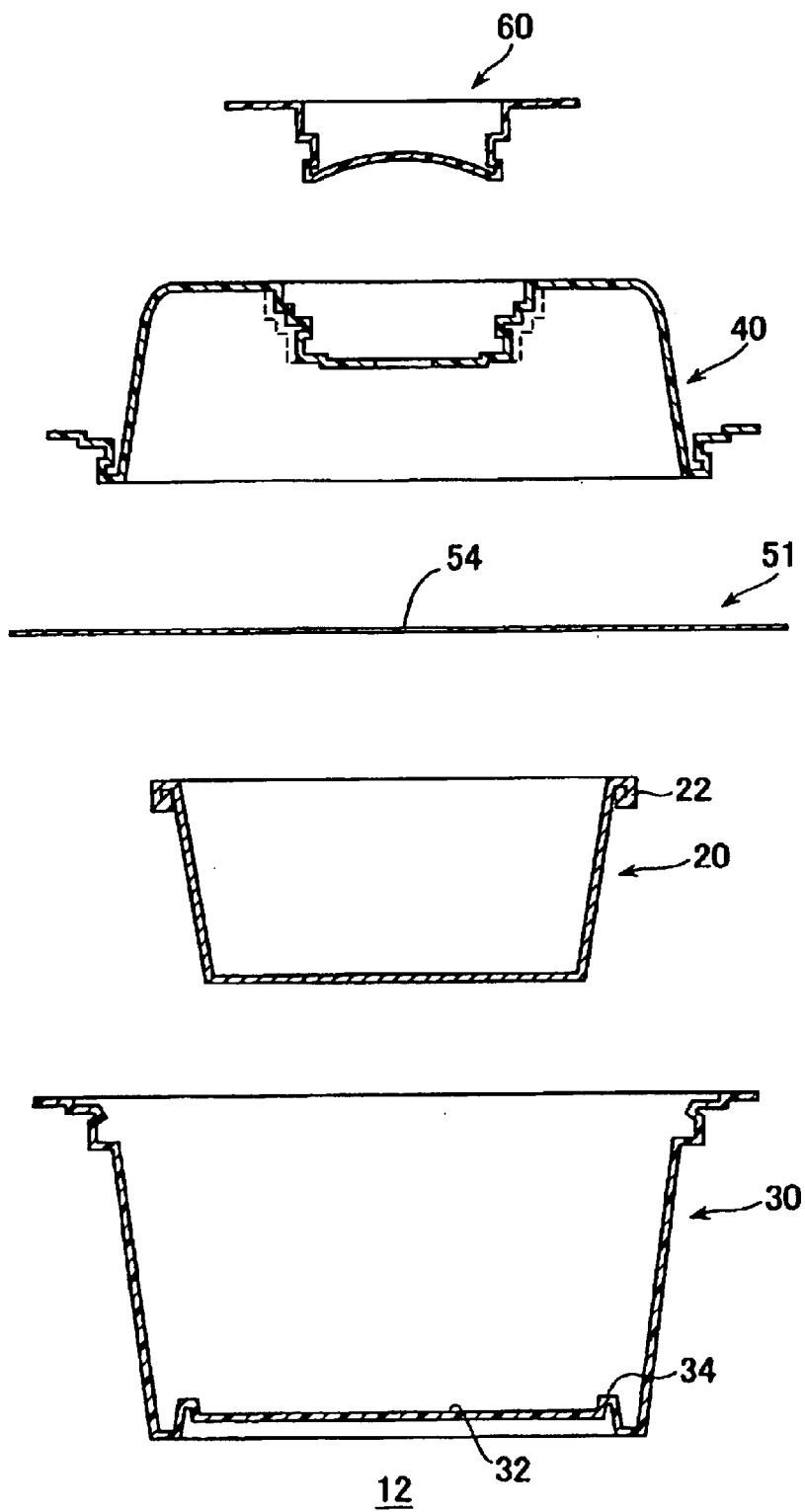
FIG. 11 is an exploded cross-sectional view of the main components of the rice cooking system of FIG. 10.
Figure 12:
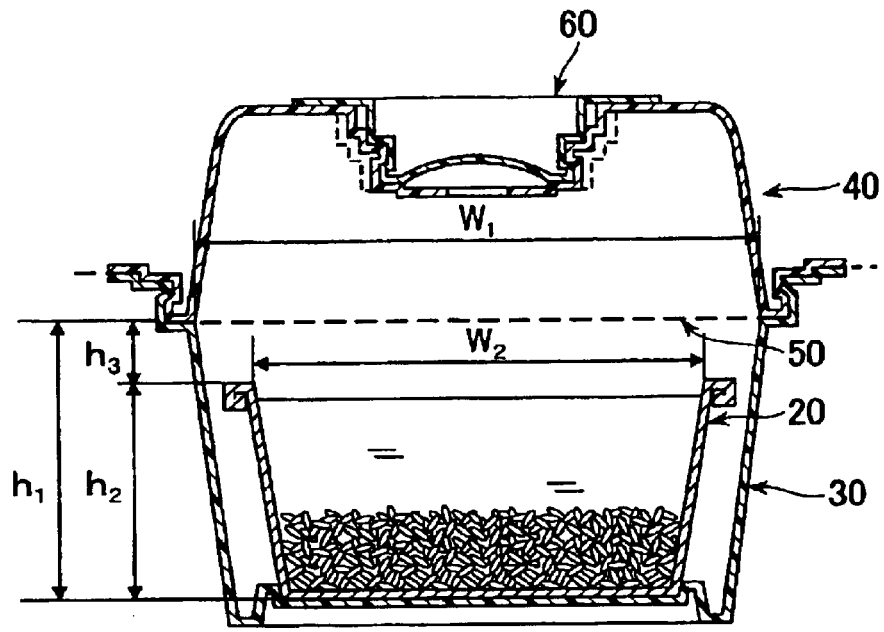
FIG. 12 is a cross-sectional view illustrating factors which determine the size of a central hole in the foam control sheet of the second embodiment.
Figure 13:
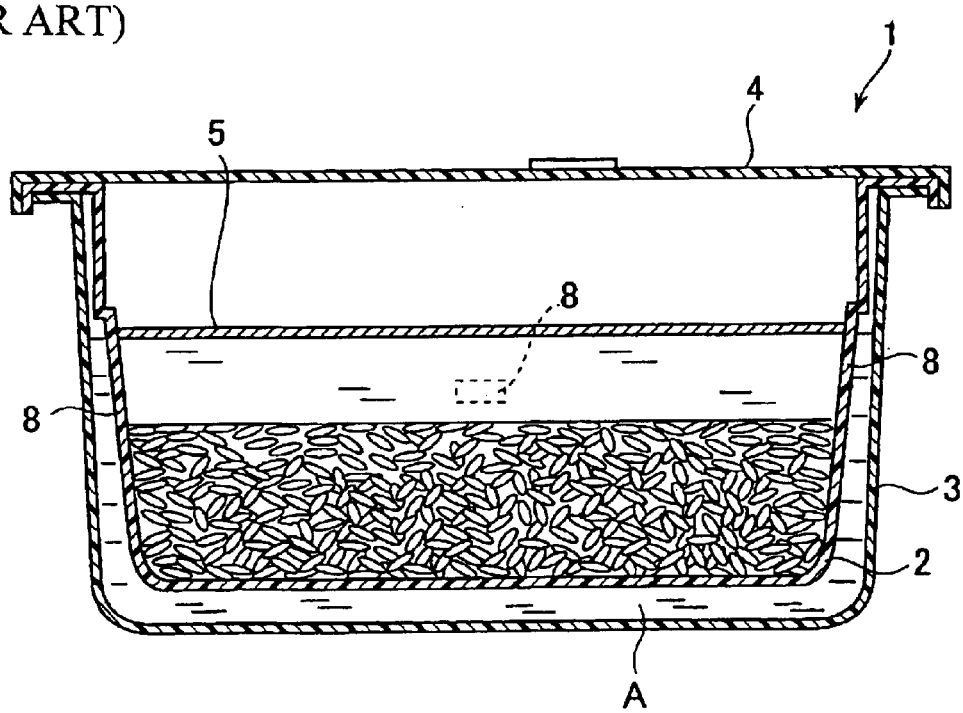
FIG. 13 is schematic cross-sectional view of a conventional rice cooking system for a microwave oven.

In the second embodiment depicted in FIGS. 10–12, parts identical to those shown in FIGS. 1–9 are designated by the same reference numbers. The principal difference between the first and second embodiments is that, in the second embodiment, rice cooking system 12, a foam control sheet 51 has not only a plurality of small holes 52 corresponding to those in the foam control sheet previously described, but also a larger central hole 54, which has radial cuts in its edge, as seen in FIG. 10.

In the second embodiment, even when foam with high adhesion is formed rapidly, and high pressure is momentarily applied to the foam control sheet 51 which will frequently occur as cooking of rice begins, the pressure may be released through the hole 54, and therefore, it is not necessary to provide a strong fit between the outer container 30 and the lid 40.

Referring to FIG. 12, the size of the central hole 54 having radial cuts is determined on the basis of the height h1 and diameter W2 of the outer container 30, the height h2 and diameter W2 of the inner container 20, the height difference h3 between height h1 of the container main body 30 and height h2 of the cooking container 20. It is preferable that lengths of the cuts at the edge of the hole 54 be 30–40% of the diameter of the hole 54, and that the diameter of the hole 54 be about 15% of the diameter of the outer container 30. Moreover, it is preferable that the total area of the small holes 52 and the hole 54 with cuts in the edge be about 8.5% or less of the total area of the foam control sheet 50.

As described above, according to the invention, the foam control sheet with holes returns only gelatinized starch (carbohydrate) to the rice. This gelatinized starch imparts glutinousness and flavor to rice. At the same time, the foam control sheet separates and removes rice bran (fat), which is contained in the foam generated in the cooking process and gives rice an unpleasant odor and turns the color of the rice from white to yellowish white. Therefore the foam control sheet, when, used in the cooking system described, effectively prevents unpleasant odors and color change, which are common problems, especially when cooking old rice.

In addition, the rim of the inner cooking container, which is made of metal, is folded or rolled. The folding or rolling of the rim prevents sudden local heating and avoids generation of sparks in microwave cooking. The cooking system heats the rice evenly as a whole, and is capable of producing, relatively easily, a cooked rice having a superior flavor, with shiny, silver-like grains and a plump and tender core.

I claim:

1. A cooking system for a microwave oven, comprising an inner cooking container, having a side surface, for containing a food and cooking water, an outer container, also having a side surface, holding said inner container with a space between the side surfaces of said containers, a lid covering said outer container, and a sheet having a plurality of holes supported between said outer container and said lid, wherein the inner container is made of metal and has a folded or rolled rim at the top of its outer surface, and wherein a step is provided at the bottom of the outer container for locating the inner container in fixed relationship to the outer container.

2. A cooking system for a microwave oven as claimed in claim 1, wherein a cap is fitted on an upper part of said lid, said cap allowing steam to be released between said lid and said cap.

3. A cooking system for a microwave oven as claimed in claim 2, wherein the area of the holes of said sheet is not more than 2.5% of the total area of said sheet.

4. A cooking system for a microwave oven as claimed in claim 2, wherein a hole having an edge, with cuts in said edge, is provided in the center of said sheet.

5. A cooking system for a microwave oven as claimed in claim 4, wherein the total area of the holes in said sheet, including said hole in the center of said sheet, is not greater than 8.5% of the total area of said sheet.

6. A cooking system for a microwave oven as claimed in claim 1, wherein the area of the holes of said sheet is not more than 2.5% of the total area of said sheet.

7. A cooking system for a microwave oven as claimed in claim 1, wherein a hole having an edge, with cuts in said edge, is provided in the center of said sheet.

8. A cooking system for a microwave oven as claimed in claim 7, wherein the total area of the holes in said sheet, including said hole in the center of said sheet, is not greater than 8.5% of the total area of said sheet.

* * * * *